United States Patent
Svoboda

(10) Patent No.: US 6,597,771 B1
(45) Date of Patent: Jul. 22, 2003

(54) METHOD OF A MESSAGE MODIFICATION IN A COMMUNICATION SYSTEM AND A DEVICE FOR PERFORMING THE METHOD

(76) Inventor: Tomáš Svoboda, Sušická 5, 160 00, Praha 6 (CZ)

( * ) Notice: Subject to any disclaimer, the term of this patent is extended or adjusted under 35 U.S.C. 154(b) by 0 days.

(21) Appl. No.: 09/857,072

(22) PCT Filed: Nov. 30, 1999

(86) PCT No.: PCT/CZ99/00048

§ 371 (c)(1),
(2), (4) Date: Sep. 18, 2001

(87) PCT Pub. No.: WO00/33545

PCT Pub. Date: Jun. 8, 2000

(30) Foreign Application Priority Data

Nov. 30, 1998 (CZ) .......................... PV3905-98

(51) Int. Cl.[7] ............................. H04M 11/00
(52) U.S. Cl. ............................. 379/93.24; 379/102.02; 709/206; 709/216; 709/246
(58) Field of Search .................. 379/93.24, 93.25, 379/93.08, 100.08, 102.01, 102.02, 102.07, 93.02, 93.03; 709/206, 216, 207, 237, 245, 246

(56) References Cited

U.S. PATENT DOCUMENTS 5,870,548 A * 2/1999 Nielsen ...................... 709/206
6,310,694 B1 * 10/2001 Okimoto et al. ............ 709/206

FOREIGN PATENT DOCUMENTS

| EP | 0 639 018 | * | 2/1995 |
| EP | 0 800 144 | * | 10/1997 |
| JP | 2001-168903 | * | 6/2001 |
| WO | W O 98/37678 | * | 8/1998 |

* cited by examiner

*Primary Examiner*—Wing Chan
(74) *Attorney, Agent, or Firm*—Pedersen & Co., PLLC; Ken J. Pedersen; Barbara S. Pedersen

(57) ABSTRACT

There is provided a method of a modification of a message in a communication system and a device for execution of the method. After receiving a message, the message being delivered into a receiver communication unit through data communication means and stored in a storage unit, there is a password allocated to the sender, the password being allocated with respect to available information about an identity of the sender, and the password is delivered back to the transmitter communication unit as acknowledgement message and serves the sender as a key for obtaining an access to functions of modification and/or deleting a message stored in the receiver communication unit.

8 Claims, No Drawings

METHOD OF A MESSAGE MODIFICATION IN A COMMUNICATION SYSTEM AND A DEVICE FOR PERFORMING THE METHOD

TECHNICAL FIELD

The invention relates to a method of a message modification in a communication system and a device for performing the method, the communication system including at least one transmitter communication unit, data communication means and at least one receiver communication unit, and the message modification being performed after the message has been sent from a home communication unit to a target one.

BACKGROUND OF THE INVENTION

There are known communication systems comprising a transmitter communication unit, data communication means end a receiver communication unit. Communication units may be both mobile and fixed. E.g. in an electronic-mail system, there are systems working in such a manner, that a created message, an electronic document, is by means of a computerised system, operating as data communication means, transmitted at first to a server of a provider of the connection and then to a mail server of an addressee. The electronic message shall be stored in the mail server, until it is withdrawn by the addressee.

By analogy, by transmission of audio messages and/or those in a text form, within the framework of a communication system, there is at one side created an audio and/or text message, which is by means of data communication means, such as a telephone network portable or fixed radio facilities, cellular wireless telephone devices etc., transmitted to a receiver communication unit, e.g. a telephone or a fax recorder.

In each case, from the moment of sending an electronic document and/or a message in audio or text from the transmitter communication unit, the sender has no possibility to modify and/or delete the message, in spite of the fact that the addressee has not withdrawn or read the message yet. If the sender later wishes to hand over some information that differs from that one included in the document delivered previously, he has only one possibility to do so, that is, to send another document referring to the original one It is an object of the invention to provide a method for a modification of a message which has already been sent away.

DISCLOSURE AND OBJECT OF THE INVENTION

The object of the invention is achieved and the foregoing problems are solved by a method of a message modification in a communication system including at least one transmitter communication unit, data communication means and at least one receiver communication unit in accordance with the present invention comprising a procedure in which after receiving a message, the message being delivered into a receiver communication unit through data communication means and stored in a storage unit, there is a password allocated to the sender, the password being allocated with respect to available information about an identity of the sender, and the password is delivered back to the transmitter communication unit as acknowledgement message and serves the sender as a key for obtaining an access to functions for modification and/or deleting a message stored in a communication unit of the receiver. Besides the access password there may be also delivered other information the receiver wants to pass to the sender. Further in accordance with the invention the received message is analysed, and provided its parameters are different from required ones, the sender is invited to modify the message. Still in accordance with the invention there is created an archive copy of a delivered message, which by means of the access password has been modified and/or deleted by the sender. According another aspect of the invention there is provided an equipment for performing the said method, the equipment including at least one transmitter communication unit, data communication means and at least one receiver communication unit, where the data communication means comprise computerised system, preferably an Internet computer, network. According to another preferred feature of this aspect of the invention the transmitter and/or receiver communication unit comprise an electronic unit and/or a system of electronic units, preferably a computer. Further in accordance with a preferred feature of the invention the data communication means comprise telecommunication means. Still in accordance with a preferred feature of the invention the transmitter and/or receiver communication unit comprise telephone and/or fax devices.

The method of a modification of a message which has been sent from a home communication unit through a communication system to a target communication unit facilitates a solution of the situation where the sender has dispatched an incorrect message, or where from the time of dispatching the message to its withdrawal by an addressee, conditions have altered so much that the said message has lost its validity. In such a case this invention allows the sender to change or delete the message without bothering the addressee with an invalid message.

The subject matter of this invention brings further advantages in cases where a message in some its characteristic features, like structured information such as an electronic signature, theme classification according a given standard, file number, etc., does not meet demands of the addressee. The communication unit of the addressee analyses the received message and the modification system according to the invention allows the sender to demand completion and/or modification of the message even before the addressee is able to withdraw it.

DESCRIPTION OF EXAMPLES OF INVENTION EXECUTION

First Example

There is described a modification of an electronic message in a communication system, namely within a framework of a message exchange through the Internet computer network.

As a transmission and/or a receiver communication unit there is applied an electronic unit such as computer and comprise input and output units and is connected to a storage unit, e.g. a mail server.

As data communication means there is used a computerised system such as the Internet computer network.

The sender dispatches a message from, his computer and the message is through the Internet network delivered to a receiver mail server. The receiver communication unit allocates an access password to the received message the decision about the access password allocation being based upon available information about the identity of the sender.

Within the receiver communication unit it is possible to set more programs, advantageously two programs for edition and allocation of access passwords. The first program provides for edition of a new password for each received message irrespective to the identity of the sender.

In the other case the identity of the sender is taken into account. Provided the identity is unknown to the receiver communication unit, which means the identity is a new one, there is a new access password created for this sender. On the contrary, the identity being known to the receiver unit, which means the sender has previously transmitted a message to the receiver unit and has therefore already received his personal access password, the receiver unit decides not to allocate a new password and the sender may further modify his messages using the original access password.

The edited access password as a return message is sent by the receiver communication unit back to the transmitter communication unit. The return message including the access password may comprise also further information the addressee wishes to pass to the sender.

The access password enables the sender to modify and/or to delete the message which is stored at the receiver mail server and has not been withdrawn yet.

As an optional function the receiver communication unit may in a further step analyse the received message and when finding it's parameters unsatisfactory or different from desired ones it demands the sender to modify the message.

As another optional function the receiver communication unit creates an archive copy of the original message which has been later modified or erased by the sender using his access password.

The Second Example

There is described a method of a modification of an audio message and/or a text message in a communication system, in which the transmitter communication unit and/or the receiver ones are provided for by an electronic unit and/or a telephone set and/or a facsimile device and a telecommunication means are represented by the data communication means.

The sender dispatches a message, e.g. an audio message from his communication unit and the message is delivered to the receiver communication unit where it is recorded in a storage unit. The receiver communication unit allocates an access password, the allocation being based upon available information about the identity of the sender.

Within the receiver communication unit it is possible to set more programs, advantageously two programs for edition and allocation of access passwords. The first program provides for edition of a new password for each received message irrespective to the identity of the sender. In this case there may be used even a simple receiver communication unit, such as a telephone recorder, which performs no identification of the sender and immediately issues an access password for each delivered message.

In the other case the identity of the sender is taken into account. Provided the identity is unknown to the receiver communication unit, which means the identity is a new one, a new access password is created for this sender. On the contrary the identity being known to the receiver unit, which means the sender has previously transmitted messages to the receiver unit and has therefore already received his personal access password, the receiver unit decides not to allocate a new password and the sender may modify his further messages using the original access password.

The edited access password as a return message is sent by the receiver communication unit back to the transmitter communication unit. The return message including the access password may comprise also further information the addressee wishes to pass to the sender.

The access password allows the sender to modify and/or cancel the message stored at the receiver mail server and has not been withdrawn yet.

As an optional function the receiver communication unit may in a further step analyse the received message and when finding its parameters unsatisfactory or different from desired ones it demands the sender to modify the message.

As another optional function the receiver communication unit creates an archive copy of the original message which has been later modified or erased by the sender using his access password.

INDUSTRIAL APPLICATIONS

The method of message modification in the communication system after its dispatching from the home communication unit to a target one is applicable in fields of computer and/or telecommunication techniques, namely for electronic mail systems and in such a case, the interchange of messages should be realised under variable circumstances requiring some modifications of already delivered messages.

What is claimed is:

1. A method of a message modification in a communication system including at least one transmitter communication unit data communication means and at least one receiver communication unit, characterized in, that after receiving a message, the message being delivered into a receiver communication unit through data communication means and stored in a storage unit, there is a password allocated to the sender, the password being allocated with respect to available information about an identity of the sender, and the password is delivered back to the transmitter communication unit as acknowledgement message and serves the sender as a key for obtaining an access to functions of modification and/or deleting a message having been stored in the receiver communication unit.

2. The method of message modification according to claim 1, characterized in, that besides the access password there are delivered other information the receiver wants to pass to the sender.

3. The method of message modification according to claim 1, characterized in, that a received message is analysed, and provided its parameters differ from required ones, the sender is invited to modify the message.

4. The method of message modification according to claim 1, characterized in, that there is created an archive copy of a delivered message, which by means of the access password has been modified and/or deleted by the sender.

5. An equipment for performing the method of message modification according to claim 1, the equipment comprising at least one transmitter communication unit, data communication means and at least one receiver communication unit, characterized in, that the data communication means comprise computerised system, preferably an internet computer network.

6. An equipment for performing the method of message modification according to claim 1, the equipment comprising at least one transmitter communication unit, data communication means and at least one receiver communication unit, characterized in, that the transmitter and/or receiver communication unit comprise an electronic unit and/or a system of electronic units, preferably a computer.

7. An equipment for performing, the method of message modification according to claim 1, the equipment comprising at least one transmitter communication unit, data communication means and at least one receiver communication unit, characterized in, that the data communication means comprise telecommunication means.

8. An equipment for performing the method of message modification according to claim 1, the equipment comprising at least one transmitter communication unit, data communication means and at least one receiver communication unit, characterized in, that the transmitter and/or receiver communication unit comprise telephone and/or fax devices.

* * * * *